US008701468B2

(12) United States Patent  (10) Patent No.: US 8,701,468 B2
Di Fiore et al.  (45) Date of Patent: Apr. 22, 2014

(54) FLOW ESTIMATION BASED ON ANODE PRESSURE RESPONSE IN FUEL CELL SYSTEM

(75) Inventors: Daniel C. Di Fiore, Scottsburg, NY (US); Jan Biebrach, Farmington, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 424 days.

(21) Appl. No.: 12/971,982

(22) Filed: Dec. 17, 2010

(65) Prior Publication Data

US 2012/0156575 A1  Jun. 21, 2012

(51) Int. Cl.
*G01M 3/26* (2006.01)

(52) U.S. Cl.
USPC ........... 73/49.7; 73/40; 73/40.5 R; 73/114.43; 73/114.52

(58) Field of Classification Search
USPC ........ 73/40.5 R, 49.7, 114.38, 114.43, 14.48, 73/114.52, 861.42, 861.43, 40
See application file for complete search history.

(56) References Cited

U.S. PATENT DOCUMENTS

| 6,413,662 | B1 * | 7/2002 | Clingerman et al. | 429/429 |
|---|---|---|---|---|
| 6,815,104 | B2 * | 11/2004 | Uehara et al. | 429/443 |
| 7,442,452 | B2 | 10/2008 | Miura | |
| 7,479,338 | B2 * | 1/2009 | Sato et al. | 429/412 |
| 7,618,734 | B2 * | 11/2009 | Rapaport et al. | 429/454 |
| 7,931,994 | B2 * | 4/2011 | Kamihara | 429/444 |
| 8,007,945 | B2 * | 8/2011 | Miyata et al. | 429/429 |
| 8,021,795 | B2 * | 9/2011 | Qi et al. | 429/467 |
| 8,114,534 | B2 * | 2/2012 | Nakayama et al. | 429/61 |
| 8,129,056 | B2 * | 3/2012 | Baaser et al. | 429/415 |
| 8,367,257 | B2 * | 2/2013 | Yumita | 429/415 |
| 2008/0141760 | A1 * | 6/2008 | Sienkowski et al. | 73/40.5 R |
| 2009/0064764 | A1 * | 3/2009 | Kizaki et al. | 73/40.5 R |
| 2009/0226783 | A1 * | 9/2009 | Hasegawa | 429/25 |
| 2010/0261079 | A1 * | 10/2010 | Kells et al. | 429/429 |
| 2011/0097635 | A1 * | 4/2011 | Quattrociocchi et al. | 429/428 |

FOREIGN PATENT DOCUMENTS

WO   WO 2004112179 A2 * 12/2004

OTHER PUBLICATIONS

Pei et al., "Hydrogen Pressure Drop Characteristics in a Fuel Cell", International Journal of Hydrogen Energy, No. 31, 2006.*
Claire Woo, "Dynamic Response of a PEM Fuel Cell Under Reactant Gas Starvation", Princeton University, Aug. 2, 2005.*
Base SAS 9.1.3 Procedures Guide, SAS Publishing, 2006.*
Larry Winner, "Simple Linear Regression I—Least Squares Estimation", available on the Internet Archive on Oct. 11, 2003 at <https://web.archive.org/web/20031011061613/http://www.stat.ufl.edu/~winner/qmb3250/notespart2.pdf>.*
Falta et al., U.S. Appl. No. 12/636,276, filed Dec. 11, 2009, entitled "Injector Flow Measurement for Fuel Cell Applications".

* cited by examiner

*Primary Examiner* — David A Rogers
(74) *Attorney, Agent, or Firm* — John A. Miller; Miller IP Group, PLC

(57) ABSTRACT

A method for determining the flow of an anode gas out of an anode sub-system. The method includes providing pressure measurements at predetermined sample times over a predetermined sample period and using the pressure measurements to calculate a slope of a line defining a change of the pressure from the beginning of the time period to the end of the time period. The slope of the pressure line is then used in a flow equation to determine the amount of gas that flows out of the anode sub-system, which can be through a valve or by system leaks.

19 Claims, 1 Drawing Sheet

FLOW ESTIMATION BASED ON ANODE PRESSURE RESPONSE IN FUEL CELL SYSTEM

BACKGROUND OF THE INVENTION

1. Field of the Invention

This invention relates generally to a method for determining flow out of a closed system and, more particularly, to a method for determining flow of anode gas out of an anode sub-system in a fuel cell system, where the method determines the slope of a pressure line formed from a plurality of pressure measurements and uses the slope in a flow calculation.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

It is necessary to accurately determine the flow rate through bleed valves, drain valves, and possibly other valves, in the anode sub-system of a fuel cell system to know when to close the particular valve, as is well understood by those skilled in the art. Traditional valve orifice models work fairly well, but are subject to part-to-part variations because the models assume an effective area of the orifice. Further, the orifice model calculation also requires a difference between an inlet and outlet pressure to determine the flow. For certain known systems, this pressure differential is on the same order of magnitude as the error of the pressure sensors, which could lead to large estimation errors.

U.S. patent application Ser. No. 12/636,276, titled Injector Flow Measurement for Fuel Cell Applications, filed Dec. 11, 2009, assigned to the assignee of this application and herein incorporated by reference, discloses a method for determining flow through a valve in a fuel cell system. An anode sub-system pressure is measured just before an injector pulse and just after the injector pulse, and a difference between the pressures is determined. This pressure difference, the volume of the anode sub-system, the ideal gas constant, the anode sub-system temperature, the fuel consumed from the reaction of the fuel cell stack during the injection event and the fuel cross-over through membranes in the fuel cells of the fuel cell stack are used to determine flow through a valve. The determination of the flow in the '276 application uses two pressure measurements that could be affected by noise in the pressure readings and provides no feedback as to the validity of the pressure measurements.

SUMMARY OF THE INVENTION

In accordance with the teachings of the present invention, a method is disclosed for determining the flow of an anode gas out of an anode sub-system. The method includes providing pressure measurements at predetermined sample times over a predetermined sample period and using the pressure measurements to calculate a slope of a line defining a change of the pressure from the beginning of the time period to the end of the time period. The slope of the pressure line is then used in a flow equation to determine the amount of gas that flows out of the anode sub-system, which can be through a valve or by system leaks.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining the flow of an anode gas out of an anode sub-system is merely exemplary in nature, and is in no way intended to limit the invention or its applications or uses. Particularly, the method discussed herein determines a flow of an anode gas out of the anode sub-system. However, the method will have application for determining the flow out of other closed systems.

Figure 1:
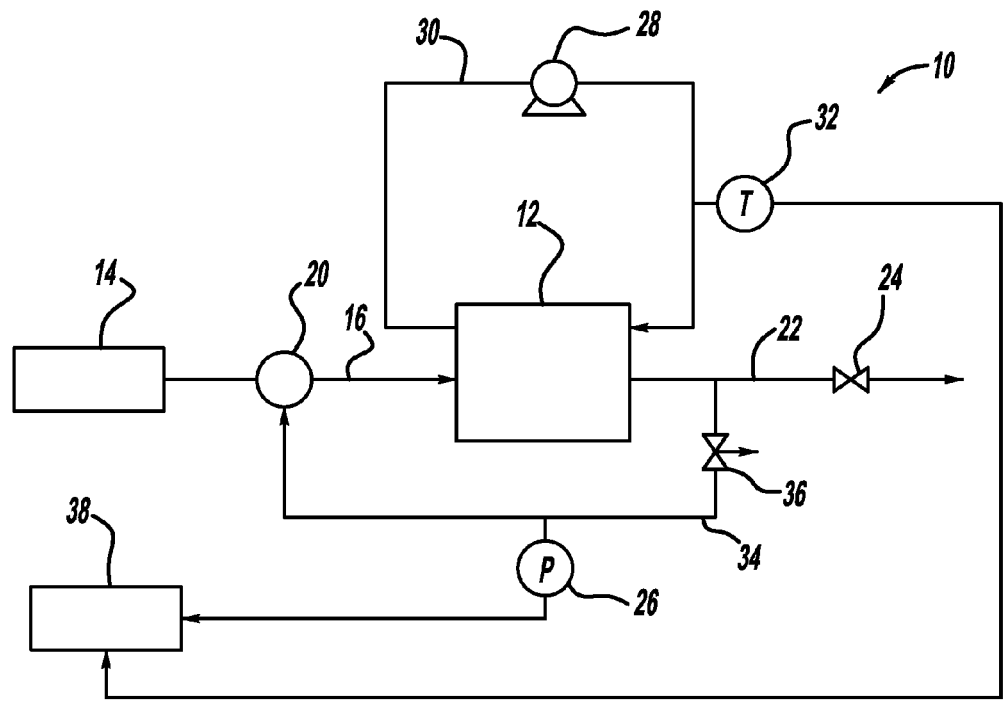
FIG. 1 is a schematic block diagram of a fuel cell system.

FIG. 1 is a schematic block diagram of a fuel cell system 10 including a fuel cell stack 12. Hydrogen gas from a high pressure hydrogen gas source 14, such as a tank, is provided to the anode side of the fuel cell stack 12 on an anode input line 16. The hydrogen gas from the source 14 is injected into the stack 12 by an injector 20, where the injector 20 is intended to represent a single injector or a bank of injectors suitable for the purposes described herein. Anode exhaust gas from the fuel cell stack 12 is output on an anode exhaust line 22. A bleed valve 24 is provided in the anode exhaust gas line 22, and is periodically opened to bleed nitrogen from the anode side of the fuel cell stack 12 in a manner that is well understood by those skilled in the art. The system 10 also includes an anode recirculation line 34 that directs the anode exhaust in the anode exhaust line 22 back to the injector 20 to be provided on the anode input line 16 when the bleed valve 24 is closed. A drain valve 36 is provided in the recirculation line 34 and is operable to periodically drain water from the recirculated anode exhaust gas, also in a manner that is well understood by those skilled in the art. A pressure sensor 26 is provided in the recirculation line 34 to measure the pressure of the anode sub-system. The location of the pressure sensor 26 is intended to represent any suitable location for measuring the pressure at the anode inlet, the anode outlet or a recycle line between the anode inlet and outlet.

The system 10 also includes a high temperature pump 28 that pumps a cooling fluid through a coolant loop 30 external to the stack 12 and through cooling fluid flow channels in the stack 12 in a manner that is well understood by those skilled in the art. A temperature sensor 32 measures the temperature of the cooling fluid flowing through the coolant loop 30, and can be provided at any suitable location in the coolant loop 30, such as at an inlet to the stack 12 where the cooling fluid is typically the coolest or at an outlet of the fuel cell stack 12 where the cooling fluid is typically the hottest. A controller 38 receives a pressure signal from the pressure sensor 26 and a temperature signal from the temperature sensor 32, and controls the duty cycle of the injector 20 and the position of the bleed valve 24 and the drain valve 36. It is necessary to know how much anode gas flows out of the valves 24 and 36 when they are opened so that it is known when to close the valves 24 and 36 for optimal system performance. The discussion below provides an accurate determination of the flow based on anode sub-system pressure.

Figure 2:
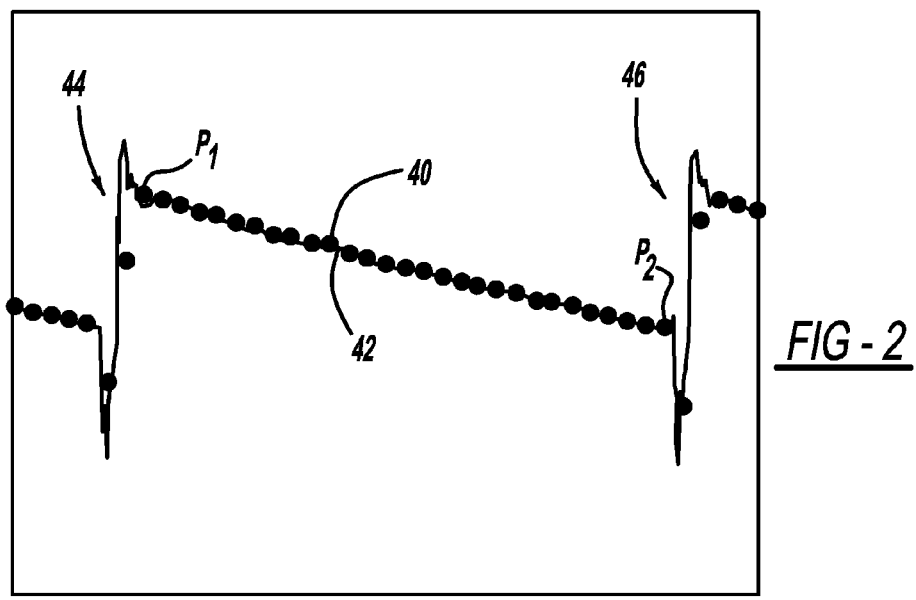
FIG. 2 is a graph with time on the horizontal axis and pressure on the vertical axis showing a change in pressure over time of an anode sub-system of a fuel cell system.

FIG. 2 is a graph with time on the horizontal axis and pressure on the vertical axis showing the anode sub-system pressure P on graph line 42 during and between injection events shown at graph locations 44 and 46. An injection event at the locations 44 and 46 is identified by a sharp drop in the anode sub-system pressure P when the injector 20 is open and then a sharp rise in the anode sub-system pressure P when the injector 20 is closed. A pressure $P_1$ is defined just after the injector 20 is closed at one injection event at the location 44 and a pressure $P_2$ is defined just before the injector 20 is opened at the next injection event at the location 46. A decay of the pressure P along the line 42 between the pressures $P_1$ and $P_2$ typically occurs for any number of reasons including a valve being opened and normal loss of pressure in the anode sub-system. For example, the bleed valve 24 can be opened during this time, the drain valve 36 can be opened during this time, there can be a leak in the closed anode sub-system if the valves 24 or 36 are closed, etc.

As will be discussed in detail below, the slope of the line 42 between the injection events is used to determine the flow rate out of the anode sub-system for any of these occurrences. The controller 38 will open the bleed valve 24 or the drain valve 36 based on various system controls and operations know to those skilled in the art, and use the flow through these valves to accurately know when to close them. Also, if the anode sub-system is closed where the valves 24 and 36 are closed, the controller 38 can determine whether there is too large of a leak from the anode sub-system. Each point 40 along the line 42 represents a pressure measurement by the pressure sensor 26. Those measurements can be taken at any suitable interval, such as every three milli-seconds.

The slope $\dot{P}$ of the pressure line 42 can be calculated along any segment of the line 42, such as a sample time between $P_1$ and $P_2$, as:

$$\dot{P} = \frac{\sum_{i=1}^{n}(t_i - \bar{t})(P_i - \bar{P})}{\sum_{i=1}^{n}(t_i - \bar{t})^2} \quad (1)$$

Where $t_i$ is the time that a pressure measurement is taken, $\bar{t}$ is an average of the sample times, $P_i$ is a pressure reading at a particular sample time and $\bar{P}$ is the average of all of the measured pressures during the sample period.

In order for the algorithm to determine whether the pressure measurement data is accurate enough to determine the flow out of the anode sub-system, the algorithm uses a pressure fit value r, as determined by equation (2) below, where the value r determines how close the pressure measurement data is to forming a straight line, and if r is less than a predetermined threshold, the pressure measurement data does not form a straight enough line, and thus is not accurate enough, and is not used to determine flow.

$$r^2 = \left(\frac{\sum_{i=1}^{n}(t_i - \bar{t})(P_i - \bar{P})}{\sqrt{\sum_{i=1}^{n}(t_i - \bar{t})^2 \sum_{i=1}^{n}(P_i - \bar{P})^2}}\right)^2 \quad (2)$$

Using this method, a number of variables are obtained to determine the validity of the calculated slope $\dot{P}$. The two major variables are the number of pressure measurement points n collected and the $r^2$ value of the linear fit compared to the data. This is important because the pressure response does not become linear until some finite time after the injector 20 was commanded close. This decay time is variable depending on a number of factors affecting the injector 20, such as supply pressure, supply voltage, coil temperature, etc. The closing time of the injector 20 is not modeled and therefore if it changes, the algorithm collects an incorrect pressure point so it is important to ignore the resulting value.

The slope $\dot{P}$ of the pressure line 42, as calculated by the equation (1), can be used to determine the flow through a valve, such as the bleed valve 24 and the drain valve 36, when those valves are open, or can be used to determine if there is a leak in the anode sub-system where a reduction in anode pressure indicates a flow of the anode gas out of the anode sub-system over time. Thus, if that flow out of the system is greater than some threshold indicating abnormal stack operation, a diagnostic flag can be set that a leak is occurring. Of course, the example herein is for flow out of the anode sub-system of the fuel cell system 10. However, using the pressure measurement to determine the slope of the pressure line can be used in any closed system where pressure can be measured.

Using equation (3) below, the flow $\dot{n}$ out of the anode sub-system can be determined as:

$$\dot{n} = \frac{\dot{P} \cdot V}{R \cdot T} - \frac{I \cdot N_{cell}}{2 \cdot F} \quad (3)$$

Where $\dot{n}$ is the flow (moles/sec), V is the anode sub-system volume in liters, which is known from stack design, R is the ideal gas constant (8.315 kPa-L/mol-K), T is the anode sub-system temperature (K), which can be provided by the stack coolant temperature sensor 32, I is stack current, $N_{cell}$ is the number of fuel cells in the stack 12 and F is Faraday's Constant (96485 A-s/mole).

Under low power operation, the leak estimate will have improved accuracy as the fuel consumption rate is gradually reduced, typically 20-100 times lower than full power, while the leak rate is only slightly reduced, typically 4-8 times lower because the differential pressures that drive leaks are typically reduced at low pressure. The accuracy in this measurement is further improved with longer decay durations as the pressure change is increased. This type of extended decay duration can be done on a very limited basis, such as once per drive cycle, to limit potential durability impact due to anode starvation. The leaked amount can be normalized by the decay duration to obtain an average leak rate. The decay duration can be used for normalization as the leak will assumed to be occurring at the same rate during the injection duration.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a flow of anode gas out of an anode sub-system of a fuel cell system, said method comprising:
    defining a time period for determining the flow where the time period is between injection events when hydrogen gas is injected into an anode side of the fuel cell stack;
    providing a measurement of the pressure in the anode sub-system at a plurality of predetermined time intervals during the time period;
    calculating a slope of a pressure line representing changes in the pressure in the anode sub-system during the time period using the pressure measurements; and
    determining the flow of anode gas out of the anode sub-system using the slope of the pressure line, wherein determining the flow of anode gas out of the anode sub-system also includes using a volume of the anode sub-system and a temperature of the anode sub-system.

2. The method according to claim 1 wherein determining the flow of anode gas out of the anode sub-system includes determining flow through a bleed valve that bleeds anode exhaust gas from the anode sub-system.

3. The method according to claim 1 wherein determining the flow of anode gas out of the anode sub-system includes determining a flow through a drain valve that drains water out of the anode sub-system.

4. The method according to claim 1 wherein determining the flow of anode gas out of the anode sub-system includes determining if there is a leak in the anode sub-system.

5. The method according to claim 1 wherein providing a measurement of the pressure at predetermined time intervals includes measuring the pressure at about every three milliseconds during the time period.

6. The method according to claim 1 wherein the anode sub-system includes a recirculation line that directs an anode exhaust gas from an output of a fuel cell stack to an anode input of the fuel cell stack.

7. The method according to claim 1 wherein the fuel cell system includes a fuel cell stack, and wherein determining the flow out of the anode sub-system also includes using an ideal gas constant, fuel cell stack current, and the number of fuel cells in the stack.

8. The method according to claim 7 wherein determining the flow includes using the equation:

$$\dot{n} = \frac{\dot{P} \cdot V}{R \cdot T} - \frac{I \cdot N_{cell}}{2 \cdot F}$$

where $\dot{n}$ is the flow (moles/sec), $\dot{P}$ is the slope of the pressure line, V is the anode sub-system volume in liters, R is the ideal gas constant (8.315 kPa-L/mol-K), T is the anode sub-system temperature (K), I is the stack current, $N_{cell}$ is the number of cells in the stack and F is Faraday's Constant (96485 A-s/mole).

9. The method according to claim 1 wherein calculating the slope of a pressure line includes using the equation:

$$\dot{P} = \frac{\sum_{i=1}^{n}(t_i - \bar{t})(P_i - \bar{P})}{\sum_{i=1}^{n}(t_i - \bar{t})^2}$$

where $t_i$ is the time that a pressure measurement is taken, $\bar{t}$ is an average of the sample times, $P_i$ is a pressure measurement at a particular sample time and $\bar{P}$ is the average of all of the measured pressures during the sample period.

10. The method according to claim 1 wherein determining the flow of anode gas out of the anode sub-system using the pressure line slope includes determining if the pressure line fits to a straight line within a predetermined threshold.

11. The method according to claim 10 wherein determining if the pressure line fits to a straight line includes using the equation:

$$r^2 = \left( \frac{\sum_{i=1}^{n}(t_i - \bar{t})(P_i - \bar{P})}{\sqrt{\sum_{i=1}^{n}(t_i - \bar{t})^2 \sum_{i=1}^{n}(P_i - \bar{P})^2}} \right)^2$$

where $t_i$ is the time that a pressure measurement is taken, $\bar{t}$ is an average of the sample times, $P_i$ is a pressure measurement at a particular sample time and $\bar{P}$ is the average of all of the measured pressures during the sample period.

12. The method according to claim 1 wherein defining a time period for determining the flow includes defining the time period between injection events when hydrogen gas is injected into an anode side of a fuel cell stack.

13. A method for determining a flow of anode gas out of an anode sub-system of a fuel cell system, said fuel cell system including a fuel cell stack, said method comprising:
    defining a time period for determining the flow where the time period is between injection events when hydrogen gas is injected into an anode side of the fuel cell stack;

providing a measurement of the pressure in the anode sub-system at a plurality of predetermined time intervals during the time period;

calculating a slope of a pressure line representing changes in the pressure in the anode sub-system during the time period using the pressure measurements;

determining if the pressure line fits to a straight line within a predetermined threshold; and determining the flow of anode gas out of the anode sub-system using the slope of the pressure line, a volume of the anode sub-system and a temperature of the anode sub-system.

14. The method according to claim 13 wherein determining the flow of anode gas out of the anode sub-system includes determining flow through a bleed valve that bleeds anode exhaust gas from the anode sub-system or a drain valve that drains water out of the anode sub-system.

15. The method according to claim 13 wherein determining the flow of anode gas out of the anode sub-system includes determining if there is a leak in the anode sub-system.

16. The method according to claim 13 wherein calculating the slope of a pressure line includes using the equation:

$$\dot{P} = \frac{\sum_{i=1}^{n}(t_i - \bar{t})(P_i - \bar{P})}{\sum_{i=1}^{n}(t_i - \bar{t})^2}$$

where $t_i$ is the time that a pressure measurement is taken, $\bar{t}$ is an average of the sample times, $P_i$ is a pressure measurement at a particular sample time and $\bar{P}$ is the average of all of the measured pressures during the sample period.

17. The method according to claim 13 wherein determining the flow includes using the equation:

$$\dot{n} = \frac{\dot{P} \cdot V}{R \cdot T} - \frac{I \cdot N_{cell}}{2 \cdot F}$$

where $\dot{n}$ is the flow (moles/sec), $\dot{P}$ is the slope of the pressure line, V is the anode sub-system volume in liters, R is the ideal gas constant (8.315 kPa-L/mol-K), T is the anode sub-system temperature (K), I is the stack current, $N_{cell}$ is the number of cells in the stack and F is Faraday's Constant (96485 A-s/mole).

18. The method according to claim 13 wherein determining if the pressure line fits to a straight line includes using the equation:

$$r^2 = \left(\frac{\sum_{i=1}^{n}(t_i - \bar{t})(P_i - \bar{P})}{\sqrt{\sum_{i=1}^{n}(t_i - \bar{t})^2 \sum_{i=1}^{n}(P_i - \bar{P})^2}}\right)^2$$

where $t_i$ is the time that a pressure measurement is taken, $\bar{t}$ is an average of the sample times, $P_i$ is a pressure measurement at a particular sample time and $\bar{P}$ is the average of all of the measured pressures during the sample period.

19. A method for determining a flow of gas out of a closed system, said method comprising:

defining a time period for determining the flow where the time period is between injection events when hydrogen gas is injected into an anode side of the fuel cell stack;

providing a measurement of the pressure in the closed system at a plurality of predetermined time intervals during the time period;

calculating a slope of a pressure line representing changes in the pressure in the closed system during the time period using the pressure measurements; and determining the flow of the gas out of the closed system using the slope of the pressure line, wherein determining the flow of anode gas out of the anode sub-system also includes using a volume of the anode sub-system and a temperature of the anode sub-system.

* * * * *